3,592,907
Patented July 13, 1971

3,592,907
SUBSTITUTED BENZO(b)THIOPHENE COMPOSITIONS
Arthur D. Chandler, Jr., and Herbert J. Florestano, Indianapolis, Ind., assignors to The Dow Chemical Company, Midland, Mich.
No Drawing. Filed Mar. 6, 1968, Ser. No. 710,750
Int. Cl. A61k 27/00
U.S. Cl. 424—275                                     9 Claims

ABSTRACT OF THE DISCLOSURE

Compositions comprising at least fifty percent of a polyethylene glycol diester carrier, such as polyethylene glycol 400 dilaurate, and an antimicrobial amount of a substituted benzo(b)thiophene compound, such as methyl 5-chloro-3-hydroxybenzo(b)thiophene-2-carboxylate, are useful for the control of fungal organisms.

BACKGROUND OF THE INVENTION

The active compounds can be prepared by methods analogous to known procedures, such as the method of Heindel et al., J. Org. Chem. 32, 2678 (1967). In the method of Heindel et al. a dialkyl (substituted-2-carbomethoxyphenylthio) fumarate is dissolved in methanol and the solution is treated with excess anhydrous ammonia for a short period of time. The alkyl substituted-3-hydroxy-benzo(b)thiophene-2-carboxylate product precipitates in the reaction mixture and is separated and purified by conventional procedures. Another conventional procedure which can be employed is that of Friedlander, Chem. Ber. 39, 1060 (1906).

SUMMARY OF THE INVENTION

This invention is directed to compositions comprising at least 50 percent by weight of a polyethylene glycol diester in admixture with a substituted benzo(b)thiophene compound. In particular, the invention is directed to compositions comprising an antifungal amount of a substituted benzo(b)thiophene compound corresponding to the formula

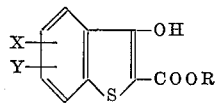

I wherein X and Y each independently represent hydrogen or halogen and R represents lower alkyl of from 1 to 2, to 3 to 4, to 5, to 6, to 7, to 8, to 9, to 10, to 11, to 12 carbon atoms, in admixture with a substantially anhydrous carrier, the carrier containing at least about 50 percent by weight of diesters of polyethylene glycols of from 200 to 600 molecular weight with fatty acids of from 12 to 18 carbon atoms, inclusive. As employed in the present specification and claims the term "halogen" refers to chloro and bromo. The active antimicrobial ingredients of the composition of the invention are thus esters of substituted benzo(b)thiophene-2-carboxylic acids with lower alkanols of from 1 to 12 carbon atoms, inclusive, and including the methyl, ethyl, propyl, butyl, pentyl, hexyl, heptyl, octyl, nonyl, decyl, undecyl, and dodecyl esters.

The compositions of the invention have been found to be remarkably effective in the control of fungal organisms. It is an outstanding feature of the invention that the compositions provide for rapid penetration of various substrates by the carrier and active ingredient, and for rapid release of the active substituted benzo(b)thiophene compound from the carrier. The compositions of the invention give better control of fungal organisms than compositions including the substituted benzo(b)thiophene compounds and other carriers such as hydrocarbon oil carriers, solid hydrocarbon carriers, polyethylene glycol carriers, alcohol carriers, and aqueous carriers.

The physical properties of the composition of the invention can be varied to provide particular compositions in the form of either liquids or solids by the selection of appropriate diesters of appropriate polyethylene glycols. Particularly preferred compositions are those wherein the polyethylene glycol employed has an average molecular weight of about 400 (polyethylene glycol 400) and the fatty acid is stearic or lauric acid. By employing different proportions of polyethylene glycol 400 distearate and polyethylene glycol 400 dilaurate both solid and liquid formulations can be prepared.

The compositions can also be formulated to include varying amounts of other carriers comprising substantially anhydrous modifying substances. Such substantially anhydrous modifying substances can be employed to vary the consistency, melting point, viscosity, and other handling characteristics of the compositions. Representative substantially anhydrous modifying substances which can be advantageously employed in the compositions of the invention include hydrocarbon oils and waxes such as solid and liquid paraffin, solid and liquid petrolatum and the like; naturally occurring oily and waxy modifying substances such as beeswax, vegetable oils and carriers of animal origin such as lanolin; and synthetic modifying substances such as fatty acid esters of polyhydric alcohols fatty acid esters of polyethylene glycols having a molecular weight from 400 to 4000, and fatty acid esters of other polyalkylene glycols such as alkylated polyethylene glycols, polypropylene glycols and the like.

The compositions can be formulated by mixing the carrier materials together with one or more of the active substituted benzo(b)thiophene compounds in any order or fashion. When one of the carrier ingredients employed is a solid, it is desirable to heat the solid carrier material to the melting point and mix the ingredients together before the addition of the substituted benzo(b)thiophene compound. The substituted benzo(b)thiophene compound can be mixed with the heated carrier by conventional procedures. Alternately, the mixture of melted and liquid carrier materials can be cooled until the mixture solidifies after which the active substituted benzo(b)thiophene compound is mixed with the solid material by conventional procedures. In any case, the active substituted benzo(b)thiophene compounds should be intimately mixed with the carrier.

An antifungal amount of the active substituted benzo-(b)thiophene compound to be incorporated in the carrier will vary depending upon such factors as the ingredients employed in formulating particular compositions, the particular substituted benzo(b)thiophene compound or mixture of the same employed, the organisms to be controlled, the substrates to be treated with the composition, the degree of fungal infestation of the substrate, and whether the composition is to be employed directly or as a concentrate to be diluted before use. Excellent antifungal results are obtained with compositions comprising from about 0.05 percent to about 10 percent of the substituted benzo (b)thiophene compound by weight of ultimate treating composition. Concentrate compositions can contain from about 5 to 10, to about 20 to 50 percent or from about 50 to 95 percent, by weight of the substituted benzo(b) thiophene compound. Since the anhydrous carrier includes at least 50 percent of the polyethylene glycol diester carrier material, a particularly preferred concentrate composition comprises one or more of the substituted benzo (b)thiophene compounds in admixture with a carrier comprising 100 percent of diesters of polyethylene glycols of 200 to 600 molecular weight with fatty acids of from 12 to 18 carbon atoms. Such compositions can be then diluted by admixture with additional amounts of the polyethylene glycol diester carrier material or other substantially anhydrous modifying materials.

The compositions of the invention can be employed in a number of applications for the control of fungi. Solid compositions are particularly useful in packing or coating machines or electrical equipment which contain materials such as electrical insulating materials, which are subject to fungal attack. The compositions can also be employed as disinfectants to combat fungal invasions in various substrates. The compositions are particularly useful as antifungal agents on substrates comprising animal skin and skin products. Also, they can be employed to disinfect and protect leather goods from attack by fungi.

The compounds wherein the alkyl group contains from 1 to 4 carbon atoms, inclusive, are conveniently prepared by the cyclization of an alkyl substituted 2-(carboloweralkoxymethylthio)benzoate corresponding to the formula

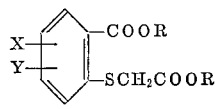

II wherein X and Y have the significance set out above with respect to Formula I and R represents loweralkyl of from 1 to 4 carbon atoms, inclusive. The diesters corresponding to Formula II can be prepared by the reaction of the corresponding substituted 2-(carboxymethylthio)benzoic acid with an alcohol of the formula ROH in the presence of an acid such as sulfuric acid or hydrochloric acid. They can also be prepared by reacting a substituted 2-(carboxymethylthio)benzoic acid with thionyl chloride and esterifying the product with an alcohol of the formula ROH. The resulting esters are then treated with a sodium alkoxide corresponding to the formula RONa to bring about internal condensation and cyclization and the resultant formation of the desired alkyl substituted benzo(b)thiophene-2-carboxylate compound. The treatment of the ester with the sodium alkoxide is preferably carried out in an alcohol of the formula ROH as a reaction medium, and at the boiling temperatupre of the reaction mixture under reflux. The product can be separated from the reaction mixture by diluting the mixture with aqueous mineral acid such as sulfuric acid to precipitate the alkyl benzo(b)thiophene-2-carboxylate product. The product can then be separated by conventional procedures such as filtration or centrifugation and purified by conventional procedures such as washing and recrystallization.

The substituted 2-(carboxymethylthio)benzoic acids can be conveniently prepared from a substituted anthranilic acid by diazotization of the anthranilic acid with nitrous acid, sodium nitrite or potassium nitrite. The resulting diazonium salt is then treated with potassium methyl xanthate followed by baisc hydrolysis and the reaction with sodium chloroacetate to prepare the substituted 2-(carboxymethylthio)benzoic acid. The substituted 2-(carboxymethylthio)benzoic acids can be separated by conventional procedures such as extraction, decantation and the like.

The compounds of the invention corresponding to Formula I wherein the alkyl group R contains from 4 to 12 carbon atoms are conveniently prepared by the trans-esterification of the compounds wherein R is methyl with an alcohol of the formula R'OH wherein R' contains from 4 to 12 carbon atoms. The trans-esterification proceeds when the methyl substituted benzo(b)thiophene-2-carboxylate is mixed with the alcohol, conveniently with an excess of the alcohol being employed as the reaction medium. The trans-esterification is conveniently carried out at the boiling point of the reaction mixture. The product can be separated from the reaction medium by conventional procedures such as fractional distillation under reduced pressure and chromatography.

The following examples are illustrative of the invention, but are not to be construed as limiting the same.

Example 1

Ten parts of polyethylene glycol 200 distearate, 10 parts of polyethylene glycol 400 dilaurate, 10 parts of polyethylene glycol 400 dipalmitate and 10 parts of polyethylene glycol 600 dimyristate are placed together in a clean, dry sterile vessel. The mixture is heated to approximately 100° C. and maintained at that temperature with stirring for about 1 hour, after which it is cooled with stirring to about 40° C. Twelve parts by weight of methyl 5 - chloro-3-hydroxybenzo(b)thiophene-2-carboxylate and three parts by weight of 4,6-dibromo-3-hydroxybenzo(b)thiophene-2-carboxylate are thoroughly mixed with the composition to prepare a concentrate composition. Ten parts of white petrolatum, 10 parts of lanolin and 5 parts of beeswax are intimately mixed together with 70 parts by weight of polyethylene glycol 400 dioleate and the mixture is milled together with the concentrate composition to prepare a treating composition containing 10 percent by weight of the active substituted benzo(b)thiophene compounds. The composition is employed to treat leather and rawhide articles to protect the same from fungal attack.

Example 2

One part by weight of propyl-3-hydroxybenzo(b)thiophene-2-carboxylate, 1 part by weight of pentyl-5,7-dichloro-3-hydroxybenzo(b)thiophene-2-carboxylate and 1 part by weight of heptyl 6-chloro-3-hydroxybenzo(b)thiophene-2-carboxylate are mixed together with 45 parts by weight of polyethylene glycol 400 distearate and 35 parts by weight of polyethylene glycol 600 dipalmitate. The resulting preparation is supplied to surfaces by swabbing to prevent attack by fungi.

Example 3

A solid preparation is prepared by placing a purified mixture of semi-solid hydrocarbons melting at about 38–54° C. (white petrolatum U.S.P.) in a clean, dry sterile vessel and heating to melt. Sufficient polyethylene glycol 400 dilaurate is mixed with the melted petrolatum to provide a carrier comprising 52 parts by weight of the polyethylene glycol 400 dilaurate and 45 parts by weight of petrolatum. 3 parts of methyl 6-chloro-3-hydroxybenzo(b)thiophene-2-carboxylate is then added to the mixture and the mixture is milled to uniform consistency. The composition is applied to cellulosic materials. such as paper, cardboard and wood articles to protect the same from attack by fungal organisms.

Example 4

Ten parts of liquid petrolatum U.S.P., 10 parts of white petrolatum U.S.P., 12 parts of Glycowax S–932 (a polyhydric alcohol fatty acid ester), 10 parts polyethylene glycol 400 distearate and 58 parts of polyethylene glycol 400 dilaurate are placed together in a clean, dry sterile vessel. The mixture is heated to approximately 125° C. and maintained at that temperature with occasional stirring for about 2 hours. The mixture is cooled with stirring, to about 40–45° C. to produce a solid, water-miscible composition. One gram of methyl 5-chloro-3-hydroxybenzo(b)thiophene-2-carboxylate is thoroughly mixed with 99 grams of the composition to make 100 grams of an antifungal preparation containing 1 percent by weight of the active substituted benzo(b)thiophene compound. The carrier of this composition thus contains 68 percent by weight of diesters of polyethylene glycol 400 with fatty acids having a molecular weight from 12 to 18.

Example 5

Several separate nutrient agar preparations are inoculated with a test organism to prepare several suspensions of viable test organisms in nutrient agar. Each agar preparation is then poured into a petri dish and allowed to solidify. Holes of uniform size are then bored into the agar in each plate and the holes are filled with the composition of Example 4. One plate inoculated with each test organism is similarly prepared as a check, holes are bored therein, and the holes are filled with the carrier of Example 4. The carrier employed in these check plates does not contain any substituted benzo(b)thiophene compound. The plates are then incubated for five days after which they are observed to ascertain the inhibition of the growth of the test organism in the nutrient agar surrounding the holes. These observations indicate lack of inhibition of the growth of *Epidermophyton floccosum, Microsporum audouini, Microsporum canis, Microsporum gypseum, Trichophyton mentagrophytes, Trichophyton rubrum, Trichophyton schoenleini,* and *Trichophyton tonsurans* in the check petri dishes, all of these petri dishes in which the carrier of Example 4 per se was employed showing uniform growth of the microorganisms throughout the agar surface. In the petri dishes in which the composition of Example 4 containing 1 percent methyl 5-chloro-3-hydroxybenzo(b)thiophene-2-carboxylate is employed, substantial inhibition of each of the test organisms is indicated by the presence of a zone of agar showing no growth of the test organisms surrounding each of the bored holes filled with the composition of Example 4.

Example 6

Several separate compositions are prepared in a manner similar to that described above with respect to Example 4. Each of these compositions comprises one of the substituted benzo(b)thiophene compounds in an amount of 0.1, 0.5 or 1.0 percent by weight of total composition. The substantial anhydrous carrier in each composition comprises an intimate mixture of 10 parts of liquid petrolatum U.S.P., 10 parts of white petrolatum U.S.P., 12 parts of Glycowax S–932, 10 parts of polyethylene glycol 400 distearate and 58 parts of polyethylene glycol 400 dilaurate. Each of the compositions is milled to a uniform consistency to obtain a series of separate compositions each containing an antifungal amount of the active substituted benzo(b)thiophene compound. The compositions are employed as coatings and for packing of materials which are subject to fungal attack, to treat various substrates to combat fungal organisms and to combat fungal organisms on animal skin and animal skin products.

Example 7

The ability of the compositions of the invention to combat fungal organisms on animal skin substrates is illustrated by the following procedure: Shaved backs of white guinea pigs are inoculated with a standardized spore suspension of *Trichophyton mentagrophytes* by scratching through the suspension over a circular area of about 1.5 centimeters in diameter with sufficient pressure to produce a slight scarification of the skin. The guinea pigs are divided into test groups. Beginning on the day following the inoculation, separate compositions of Example 6 are separately applied to the inoculated area of skin on each guinea pig in a test group. The application of the separate compositions of Example 6 to the inoculated areas of the skin on the guinea pigs in the separate groups is continued daily for five additional days for a total of six applications to each inoculated area of skin surface. Similar inoculations of *Trichophyton mentagrophytes* are carried out on the skin surfaces of a separate group of guinea pigs to serve as a check; however, no composition is applied to the infected area. In the check group of guinea pigs a definite area of erythema appears in 2 to 3 days after the inoculation, increasing with minor scaling through about the fifth day. At about the sixth day the continued presence of the fungal organism is indicated by a bloody serous lesion showing a raised periphery and increased scaliness with crust formation beginning to develop. The crust formation continues in the check group of guinea pigs, reaching a maximum development at about the twelfth day after inoculation indicating continued presence of the fungal organism.

Control of the fungal organisms is indicated by failure of the inoculated skin surface to develop past the erythematous stage, absence of scaliness or crust formation and absence of lesions during the six days during which the composition was applied and during the following period of up to twelve days after the inoculation. Lack of control of the fungal organism in animal skin substrate is indicated by development of bloody serous lesions having the same pattern and duration as those observed in the check group of animals. The results expressed as percent control of fungal organisms for each composition and the concentration of the substituted benzo(b)thiophene compound in each composition is set out for each of the test compounds in Table I. In Table I, X, Y and R are specified for each compound corresponding to Formula I.

TABLE I

| X | Y | R | Concentration (percent) | Percent control of fungal organism |
|---|---|---|---|---|
| H | H | Methyl | 0.5 | 100 |
| H | H | Ethyl | 0.5 | 100 |
| H | H | n-Butyl | 0.5 | 100 |
| H | H | Hexyl | 0.5 | 100 |
| H | H | Octyl | 0.5 | 100 |
| H | H | Decyl | 0.1 | 67 |
| H | H | Dodecyl | 0.1 | 60 |
| 5-Cl | H | Methyl | 0.1 | 100 |
| 6-Cl | H | do | 0.1 | 100 |
| 7-Cl | H | do | 0.5 | 100 |
| 5-Cl | H | Ethyl | 0.5 | 100 |
| 6-Cl | H | do | 1.0 | 100 |
| 5-Cl | H | Butyl | 1.0 | 67 |
| 6-Cl | H | do | 0.1 | 67 |

Example 8

The procedure of Example 7 is repeated with representative compositions of Example 6, the sole variation being that the areas of skin surface inoculated with the fungal organisms are left untreated for a total of four days following the initial inoculation. Application of the compositions is begun on the fourth day after the inoculation and is continued daily for a total of seven daily applications. In these operations each of the compositions contain 1 percent by weight of a substituted benzo(b)thiophene compound. The percent control of fungal organisms is set out below in Table II for each compound identified by the moieties X, Y and R with respect to Formula I.

TABLE II

| X | Y | R | Percent control |
|---|---|---|---|
| H | H | Hexyl | 100 |
| H | H | Octyl | 100 |
| H | H | Decyl | 100 |
| 5-chloro | H | Methyl | 100 |
| 5-chloro | H | Butyl | 100 |
| 6-chloro | H | do | 100 |

Example 9

Three separate compositions comprising methyl 5-chloro-3-hydroxybenzo(b) thiophene-2-carboxylate in the amount of 1 percent by weight are prepared. The first composition (A) comprises the substituted benzo(b)thiophene compound in a carrier consisting of 10 parts by weight of liquid petrolatum U.S.P., 10 parts by weight of white petrolatum U.S.P., 12 parts by weight of Glycowax S–932, 10 parts of polyethylene glycol 400 distearate and 58 parts of polyethylene glycol 400 dilaurate. The second composition (B) comprises 1 percent of the substituted benzo(b)thiophene compound in polyethylene glycol 400 and the third composition (C) comprises 1 percent of the substituted benzo(b)thiophene compound in white petrolatum. Each of these compositions is tested for the control of fungal organisms by the procedures described above with respect to Example 8. The first composition is found to give 100 percent control of the fungal organisms, while no control of the fungal organisms is obtained with the second and third compositions, (B) and (C). No control of fungal organisms is observed when the carrier of composition (A) is employed per se, without a substituted benzo(b)thiophene compound.

Example 10

A liquid composition is prepared by intimately mixing together 3 parts by weight of methyl 5-chloro-3-hydroxybenzo(b)thiophene-2-carboxylate, 3 parts by weight of methyl 4-bromo-3-hydroxybenzo(b)thiophene-2-carboxylate, and 2 parts by weight of ethyl 5-chloro-7-bromo-3-hydroxybenzo(b)thiophene-2-carboxylate and 125 parts by weight of polyethylene glycol 400 dilaurate. The liquid composition is applied by conventional procedures such as swabbing, pouring or the like to protect materials from fungal attack.

What is claimed is:

1. An antifungal composition comprising an antifungal amount of a substituted benzo(b)thiophene compound corresponding to the formula

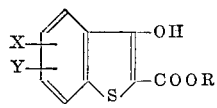

wherein X and Y each idenpendently represent hydrogen, chlorine or bromine and R represents lower alkyl of from 1 to 12 carbon atoms, inclusive, in admixture with diesters of polyethylene glycols of from 200 to 600 molecular weight with fatty acids of from 12 to 18 carbon atoms, inclusive.

2. Composition of claim 1 wherein the substituted benzo(b)thiophene compound is present in the amount of from about 0.05 to about 10 percent by weight of the total composition.

3. The composition of claim 1 wherein the substantially anhydrous carrier is selected from the group consisting of polyethylene glycol 400 distearate and polyethylene glycol 400 dilaurate.

4. Composition of claim 1 wherein the substituted benzo(b)thiophene compound is loweralkyl 3-hydroxybenzo(b)thiophene-2-carboxylate.

5. Composition of claim 1 wherein the substituted benzo(b)thiophene compound is loweralkyl 5-chloro-3-hydroxybenzo(b)thiophene-2-carboxylate.

6. The composition of claim 1 wherein the substituted benzo(b)thiophene compound is loweralkyl 6-chloro-3-hydroxybenzo(b)thiophene-2-carboxylate.

7. Composition of claim 1 wherein the compound is methyl 3-hydroxy-halobenzo(b)thiophene-2-carboxylate.

8. Composition of claim 7 wherein the substituted benzo(b)thiophene compound is methyl 5-chloro-3-hydroxybenzo(b)thiophene-2-carboxylate.

9. Composition of claim 7 wherein the substituted benzo(b)thiophene compound is methyl 6-chloro-3-hydroxybenzo(b)thiophene-2-carboxylate.

References Cited
UNITED STATES PATENTS

| | | | |
|---|---|---|---|
| 2,713,019 | 1/1955 | Jeffries | 424—365 |
| 2,781,289 | 2/1957 | Elmer et al. | 424—275 |
| 3,413,308 | 11/1968 | Bockstahler | 260—330.5 |

JEROME D. GOLDBERG, Primary Examiner